(12) United States Patent
Kim et al.

(10) Patent No.: US 6,714,524 B1
(45) Date of Patent: Mar. 30, 2004

(54) STATE SYNCHRONIZATION METHOD BETWEEN A BASE STATION AND A MOBILE STATION IN A CDMA COMMUNICATION SYSTEM

(75) Inventors: Young-Ky Kim, Seoul (KR); Hyun-Suk Lee, Seoul (KR); Sun-Mi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/332,721

(22) Filed: Jun. 14, 1999

(30) Foreign Application Priority Data

Jun. 13, 1998 (KR) ............................................. 98/22217

(51) Int. Cl.⁷ ............................................. H04B 7/216
(52) U.S. Cl. ........................ 370/335; 370/342; 370/503
(58) Field of Search ................................. 370/276, 277, 370/278, 282, 335, 342, 441, 503, 507, 522, 517; 375/722; 455/502, 509, 68

(56) References Cited

U.S. PATENT DOCUMENTS

| | | | | |
|---|---|---|---|---|
| 5,537,685 A | * | 7/1996 | Matsuno | 455/502 |
| 5,954,799 A | * | 9/1999 | Goheen et al. | 370/351 |
| 5,966,384 A | * | 10/1999 | Felix et al. | 370/465 |
| 6,198,728 B1 | * | 3/2001 | Hulyalkar et al. | 370/252 |
| 6,215,778 B1 | * | 4/2001 | Lomp et al. | 370/335 |

FOREIGN PATENT DOCUMENTS

EP    0332818    9/1989

OTHER PUBLICATIONS

First Office Action of the Patent Office of the People's Republic of China dated Aug. 2, 2002, issued in a counterpart application, namely, Appln. No. 99807326.1.

* cited by examiner

*Primary Examiner*—Ajit Patel
(74) *Attorney, Agent, or Firm*—Dilworth & Barrese LLP

(57) ABSTRACT

State synchronization methods for transmitting packet data between a base station and a mobile station in a CDMA mobile communication system are provided. In one method, the base station transmits a state check message to the mobile station in an active state. The base station receives a response message from the mobile station, and analyzes the received response message to determine a state of the mobile station. The base station terminates a corresponding channel and transitions to the state of the mobile station. In a second method for transmitting packet data between a base station and a mobile station in a CDMA mobile communication system, the mobile station transmits a state check message to the base station in an active state. The mobile station receives a response message from the base station and analyzes the received response message to determine a state of the base station. The mobile station terminates a corresponding channel and transitions the mobile station to the state of the base station.

6 Claims, 8 Drawing Sheets

STATE SYNCHRONIZATION METHOD BETWEEN A BASE STATION AND A MOBILE STATION IN A CDMA COMMUNICATION SYSTEM

PRIORITY

This application claims priority to an application entitled "State Synchronization Between Base Station and Mobile Station In CDMA Mobile Communication System" filed in the Korean Industrial Property Office on Jun. 13, 1998 and assigned Serial No. 98-22217, the contents of which are incorporated herein by reference.

BACKGROUND OF THE INVENTION

1. Field of the Invention

The present invention relates to a mobile communication system and in particular, to a state synchronization method between a base station and a mobile station with a reduced signaling overhead during a packet data service in a MAC (Medium Access Control) sublayer of a CDMA (Code Division Multiple Access) mobile communication system.

2. Description of the Related Art

Mobile communication systems provide a circuit switch service and a packet data service. In the packet data service, signaling messages are frequently generated and compared with the circuit switch service. Packet data has a burst property, i.e. it is generated discontinuously. Therefore, a dedicated traffic channel and a dedicated control channel are discontinuously assigned to all users during a service time period in consideration of the following factors: a radio resource capacity, of the mobile communication system capability of a base station, in serving all users; and power consumption of a mobile station.

Instead, the dedicated channels are assigned during the occurrence of traffic. If a prescribed time period elapses after transmission of packet data, the dedicated channels are terminated, so that other users can use these resources. That is, channels are dynamically assigned. In a system providing the packet data service, the base station and mobile station undergo changes in states depending on whether data is generated, and therefore, an occurrence of a signaling messages between the base station and the mobile station is quite common. Hence, it is important to maintain synchronization between the base station and mobile station.

In a conventional CDMA mobile communication system, the circuit switch service has mainly been provided to synchronize the base station with the mobile station. Most of the signaling messages used in the conventional system are for processing call setup, handoff and call termination, and they are generated from a layer three. Upon transmission of a signaling message from the base station to the mobile station, a command is transmitted over a forward link, and the mobile station receiving the command transmits a response to the base station. The base station again transmits a confirm message to inform the mobile station that the command has been normally processed. Meanwhile, upon transmission of a signaling message from the mobile station to the base station, a request is transmitted over a reverse link, and the base station receiving the request transmits a response to the mobile station.

The back and forth transmission of signaling messages between the base station and the mobile station is defined as the signaling overhead of the communication system.

FIGS. 1A and 1B respectively illustrate conventional signaling message transmission processes when a base station (BS) informs a mobile station (MS) of an occurrence of an event and when the mobile station (MS) informs the base station (BS) of an occurrence of an event. These signaling message transmission processes are used for processing layer-3 signaling messages generated during call setup, handoff and call termination. However, since the above processes transmit and receive the signaling messages one by one, many radio resources are used and signaling overhead is increased, and hence it takes quite some time to maintain synchronization between the base station and the mobile station. Accordingly, system performance and efficiency are decreased.

SUMMARY OF THE INVENTION

It is an object of the present invention to provide a method for minimizing signaling overhead to maintain synchronization between a base station and a mobile station in a MAC sublayer of a mobile communication system having a packet data service which undergoes frequent state changes.

It is another object of the present invention to provide a method for reducing unnecessary consumption of radio resources and a synchronization time by variably performing a synchronization between a base station and a mobile station according to service circumstances or predetermined system conditions.

To achieve the above objects, the present invention provides a state synchronization method for transmitting packet data between a base station and a mobile station in a CDMA mobile communication system. The method includes the steps of: transmitting, at the base station, a state check message to the mobile station in an active state; receiving, at the base station, a response message from the mobile station; and analyzing the received response message to determine a state of the mobile station, terminating a corresponding channel, and transitioning the base station to the state of the mobile station.

According to the present invention, if the mobile station is in an active state the base station maintains the active state; if the mobile station is in a control hold state, the base station terminates a dedicated traffic channel to transition to the control hold state; if the mobile station is in a suspended state, the base station terminates the dedicated traffic channel to transition to the control hold state and then terminates a dedicated control channel to transition to the suspended state, and if the mobile station is not in one of the active state, control hold state, and the suspended state, the base station terminates the dedicated traffic channel to transition to the control hold state and terminates the dedicated control channel to transition to the suspended state, and terminates a common control channel to transition to a dormant state.

The present invention further provides a state synchronization method for transmitting packet data between a base station and a mobile station in a CDMA mobile communication system. The method includes the steps of transmitting, at the mobile station, a state check message to the base station in an active state; receiving, at the mobile station, a response message from the base station; and analyzing the received response message to determine a state of the base station, terminating a corresponding channel, and transitioning the mobile station to the state of the base station.

If the base station is in an active state, the mobile station maintains the active state; if the base station is in a control hold state, the mobile station terminates a dedicated traffic channel to transition to the control hold state; if the base station is in a suspended state, the mobile station terminates the dedicated traffic channel to transition to the control hold state and then terminates a dedicated control channel to transition to the suspended state; and if the base station is not in one of the active state, control hold state, and suspended state, the mobile station terminates the dedicated traffic channel to transition to the control hold state and terminates the dedicated control channel to transition to the suspended state, and terminates a common control channel to transition to a dormant state.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1A:
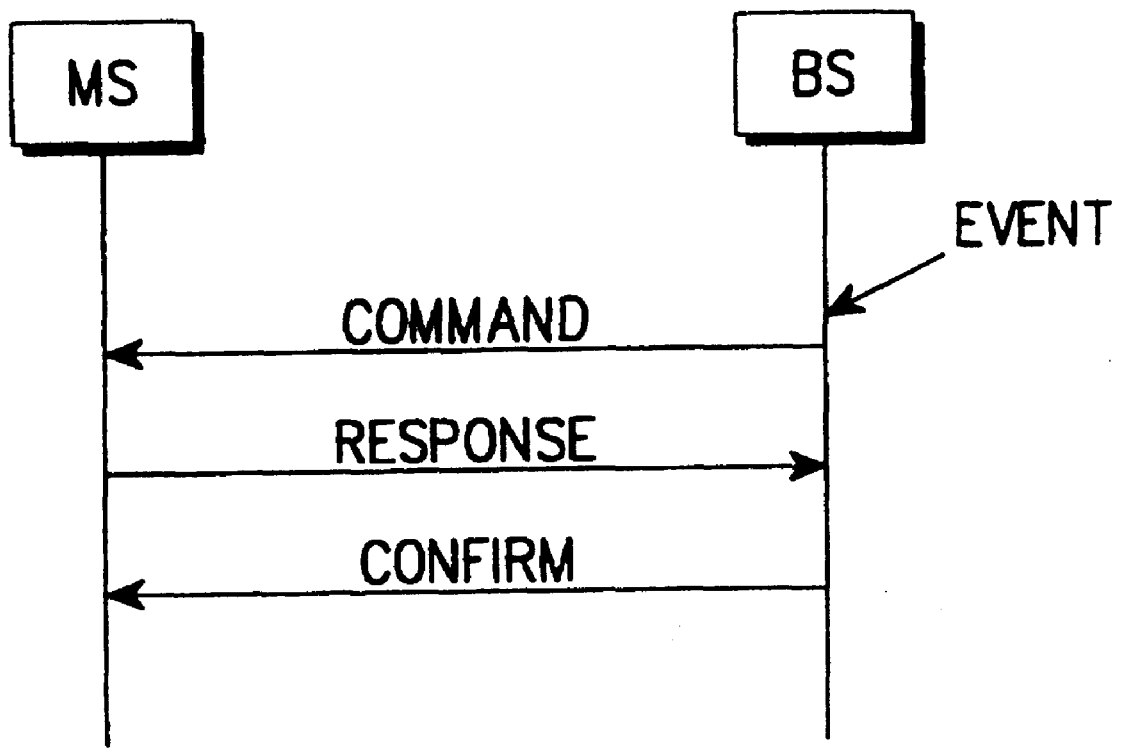
FIG. 1A illustrates a prior art signaling message transmission process when a base station informs a mobile station of an occurrence of an event.
Figure 1B:
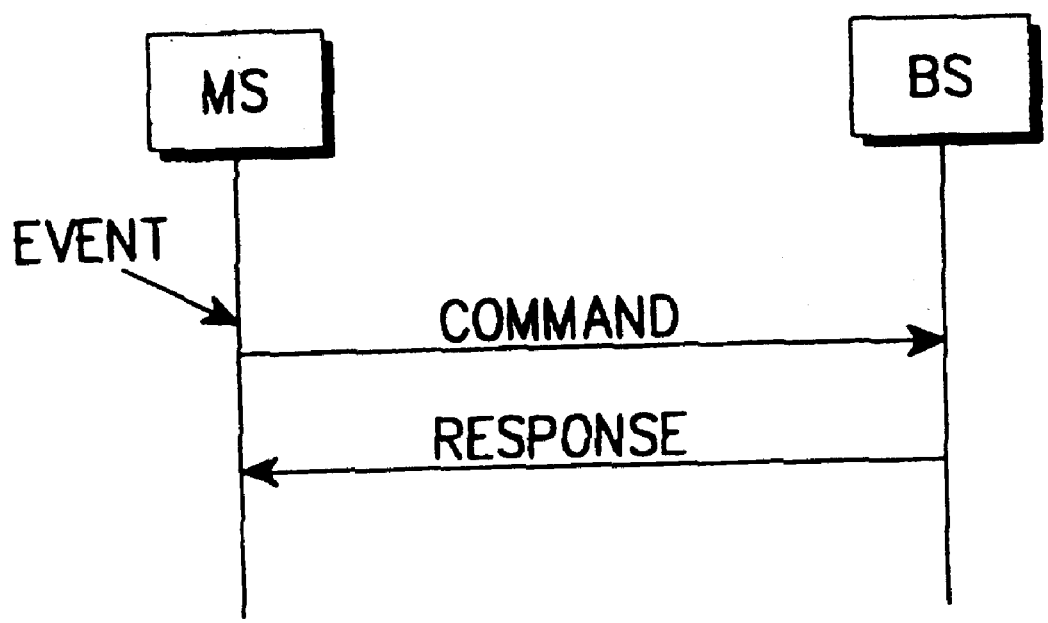
FIG. 1B illustrates a prior art signaling message transmission process when a mobile station informs a base station of an occurrence of an event.

A preferred embodiment of the present invention will be described herein below with reference to the attached drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

The present invention uses a state timer or a watch timer in addition to transmitting known signaling messages during a watch period, i.e., when the watch time is clocking, to maintain synchronization between a base station and a mobile station. Both the base station and mobile station may be equipped with these timers or only one of them may be equipped with these timers. A synchronization method between the base station and mobile station differs according to service circumstances (for example, a stable radio circumstance such as an indoor space, or a slow or fast moving mobile station circumstance). In using signaling messages, only a command message may be used or both the command message and a response message may be used according to the service circumstances, for reducing signaling overhead.

The state timer checks a transition time from a current state to the next state, and the watch timer checks whether state inconsistency occurs. Therefore, if the two timers are used, a state transition is possible without the signaling messages and state inconsistency can easily be checked.

A state synchronization method using the timers is divided into three types: a distributed type in which the base station and mobile station each have the state timer and watch timer, a base station mastered type in which the base station has the state timer and watch timer, and the mobile station has only the watch timer, and a mobile station mastered type in which the base station has only the watch timer, and the mobile station has the state timer and watch timer.

The distributed type which does not use the signaling messages does not create signaling overhead, but if there is a malfunction in either the base station or the mobile station, state inconsistency may occur. The base station mastered type or mobile station mastered type should transmit the signaling message to the other mobile station or base station if there is a state transition by expiration of the state timer, thereby using many radio resources as compared with the distributed type. This creates signaling overhead and lengthens a state synchronization time.

According to the present invention, the signaling overhead can be reduced by including a response request field in a command message, unlike a conventional method in which a response message is transmitted upon receipt of a command message. Namely, if a frame error rate (FER) exceeds a threshold value, this response request field is set and a response request message is transmitted. A command message receiving side then transmits a response message. If other radio circumstances are stable, only a command message is transmitted. Because the FER is high while the mobile station moves fast or passes a place where radio interference is severe, it is preferable to use both the signaling messages and timers for reliable state synchronization. Since a packet data service under stable radio circumstances has a weak possibility of creating state inconsistency caused by handoff, it is possible to maintain synchronization between the base station and mobile station by using the timer. That is, if the watch timer expires, it is determined that there is state inconsistency, and the signaling message is used to maintain synchronization. Here, if the FER is greater than a threshold value, a command message including a response request field indicating a response message transmission request is transmitted.

Figure 2A:
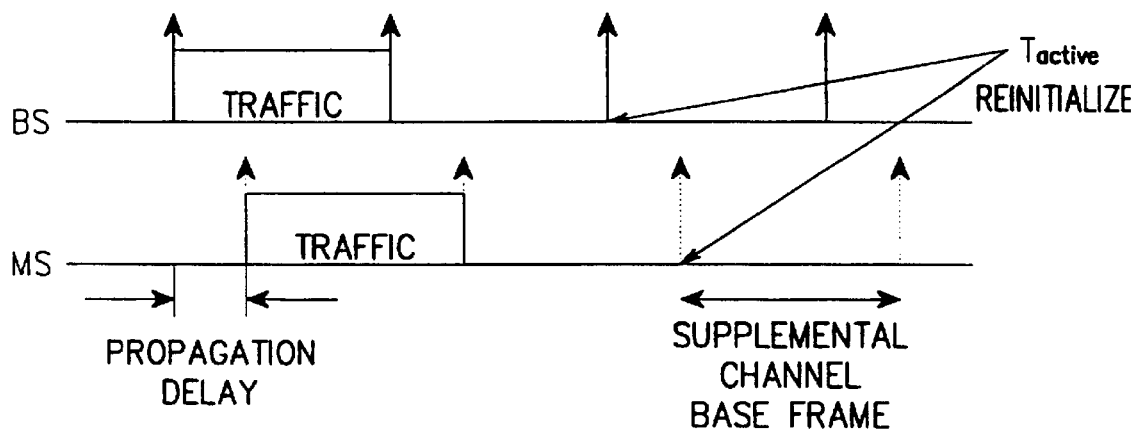
FIG. 2A illustrates a state timer reinitialization process applied to a forward supplemental channel according to an embodiment of the present invention.
Figure 2B:
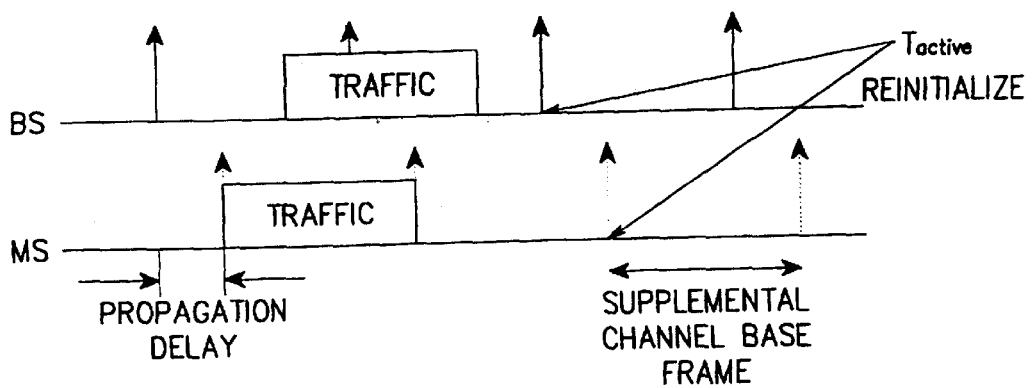
FIG. 2B illustrates a state timer reinitialization process applied to a reverse supplemental channel according to an embodiment of the present invention.

FIGS. 2A and 2B illustrate state timer reinitialization processes applied respectively to a forward supplemental channel and a reverse supplemental channel. An active state timer $T_{active}$ is reinitialized by transmission of packet data when a control hold state transitions to the active state on the assumption that the base station and mobile station each have the state timer. Arrows having a solid line designate a radio frame transmission time of the base station, and arrows indicated by a dotted line designate a radio frame transmission time of the mobile station. Since the mobile station maintains synchronization with information transmitted from the base station, a slight delay occurs. In other words, the radio frame transmission time of the mobile station lags behind that of the base station on a time basis. Therefore, the arrows corresponding to the mobile station are not aligned with those corresponding to the base station.

Referring to FIG. 2A, if the base station transmits a traffic at the radio frame transmission time, the mobile station receives the traffic with a prescribed propagation delay. The base station reinitializes the active state timer $T_{active}$ upon completing transmission of data to the mobile station, and the mobile station also reinitializes the active state timer $T_{active}$ upon completing receipt of data. Referring to FIG. 2B, if the mobile station transmits a traffic at the radio frame transmission time, the base station receives the traffic with a prescribed propagation delay. The mobile station reinitializes the active state timer $T_{active}$ upon completing transmission of data to the base station, and the base station also reinitializes the active state timer $T_{active}$ upon completing receipt of data.

Figure 3:
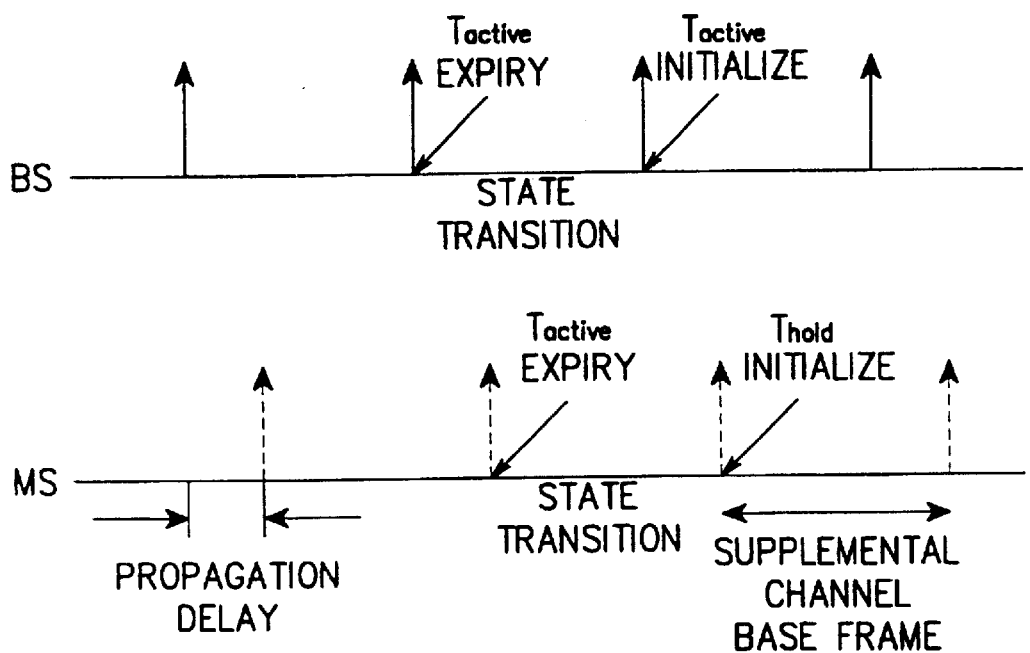
FIG. 3 illustrates a transition process from an active state to a control hold state using a state timer according to an embodiment of the present invention.

FIG. 3 illustrates a transition process from an active state to a control hold state using a state timer. A transition from the active state to the control hold state happens when the active state timer $T_{active}$ expires. Similarly, a transition from the control hold state to a suspended state happens when a control hold timer $T_{hold}$ expires in a normal case. If the active state timer $T_{active}$ expires without transmission of a packet for a prescribed time period in the active station, a dedicated traffic channel DTCH is terminated, the active state transitions to the control hold state, and the control hold state timer $T_{hold}$ is driven. The control hold state timer $T_{hold}$ is used to check a transition time to the suspended station. The term "state timer" described with reference to the other drawings except FIG. 3 denotes the active state timer $T_{active}$.

Figure 4:
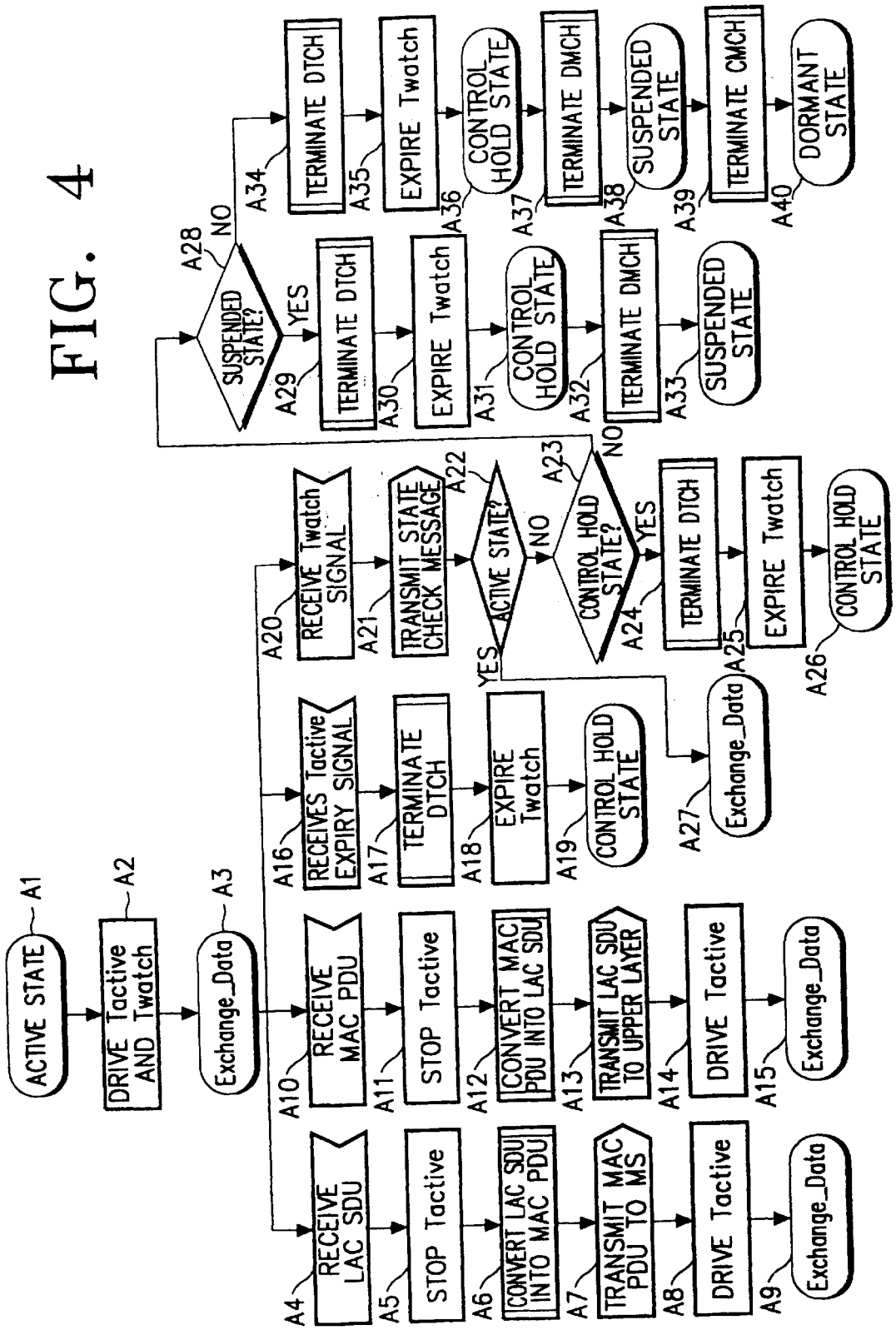
FIG. 4 is a flow chart illustrating a state synchronization process executed by a base station having a state timer and a watch timer for packet data transmission with a mobile station according to an embodiment of the present invention.

FIG. 4 is a flow chart illustrating a state synchronization process executed by the base station having a state timer and a watch timer for packet data transmission with the mobile station.

The base station drives a watch timer $T_{watch}$ in the active state. The watch timer $T_{watch}$ watches whether there is state inconsistency between the base station and the mobile station. If there is, the base station restores the state inconsistency. If the state is synchronous, the base station converts an LAC SDU (Link Access Control Service Data Unit) descending from an upper layer into a MAC PDU (Medium Access Control Protocol Data Unit) and transmits the MAC PDU to a lower layer. Meanwhile, the base station converts the MAC PDU ascending from the lower layer into the LAC SDU and transmits the LAC SDU to the upper layer. The detailed description of this process will now be given with reference to FIG. 4.

The base station drives the state timer $T_{active}$ and the watch timer $T_{watch}$ in the active state and transitions to a data exchange substate (hereinafter, referred to as the Exchange__Data state) which can exchange data (steps A1–A3). If the LAC SDU or MAC PDU is received from the upper layer or lower layer (step A4 or A10), the base station stops driving the state timer $T_{active}$ and converts the received LAC SDU into the MAC PDU and the MAC PDU into LAC SDU (steps A5, A6, A11 and A12). The base station transmits the converted data to the lower layer or upper layer, drives the state timer $T_{active}$ again, and returns to the Exchange__Data state (steps A7–A9 and A 13–A15).

If the state timer $T_{active}$ expires in the Exchange__Data state, the base station terminates a dedicated traffic channel DTCH, stops the watch timer $T_{watch}$, and transitions to the control hold state (steps A 16–A19).

If a watch timer signal is received in the Exchange__Data state, the base station transmits a state check message to the mobile station (steps A20 and A21). The mobile station receiving the state check message transmits a response message to inform the base station of its current state. If it is judged from the response message that the mobile station maintains the active state, the base station returns to the Exchange__Data state (steps A22 and A27). If the mobile station is not in the active state, the base station checks whether the mobile station is in the control hold state (steps A22 and A23). If yes, the base station terminates the dedicated traffic channel DTCH, stops the watch timer $T_{watch}$, and transitions to the control hold state (steps A23–A26).

If the mobile station is not in the control hold state, the base station checks whether the mobile station is in a suspended state (steps A23 and A28). If so, the base station terminates the dedicated traffic channel DTCH, stops the watch timer $T_{watch}$, and transitions to the control hold state (steps A28–A31). The base station then terminates a dedicated control channel (for example, a dedicated MAC channel DMCH) and transitions to the suspended state (steps A32 and A33).

If the mobile station is not in the suspended state, the base station terminates the dedicated traffic channel DTCH, stops the watch timer $T_{watch}$, and transitions to the control hold state (steps A34–A36). The base station then terminates the dedicated MAC channel DMCH, transitions to the suspended state, terminates a common MAC channel CMCH, and transitions to a dormant state (steps A37–A40).

Thus the present invention provides methods for periodically checking state inconsistency by using the watch timer $T_{watch}$ and to rapidly terminate a corresponding channel, thereby effectively using radio resources.

Figure 5:
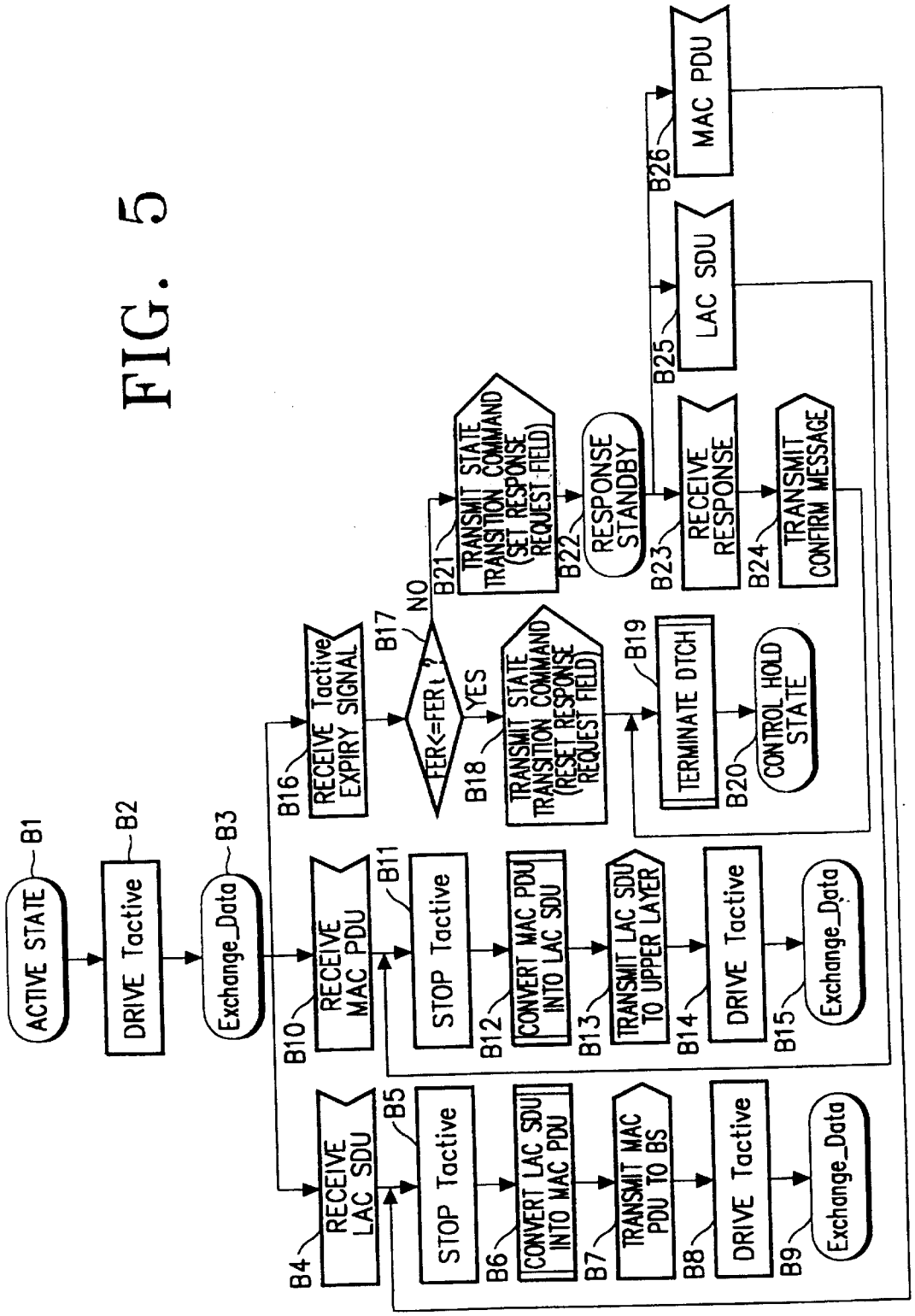
FIG. 5 is a flow chart illustrating a state synchronization process executed by a base station generating a state transition command including a response request field for packet data transmission with a mobile station according to an embodiment of the present invention.

FIG. 5 is a flow chart illustrating a state synchronization process executed by the base station generating a state transition command including a response request field for packet data transmission with the mobile station.

The base station has the state timer $T_{active}$ and the state transition command is generated when the state timer $T_{active}$ expires.

The base station drives the state timer $T_{active}$ in the active state and transitions to the Exchange_Data state which can exchange data (steps B1–B3). The base station receives the LAC SDU or MAC PDU from the upper layer or lower layer (step B4 or B10). The base station stops driving the state timer $T_{active}$ and converts the received LAC SDU into the MAC PDU and the MAC PDU into LAC SDU (steps B5, B6, B 11 and B12). The base station transmits the converted data to the lower layer or upper layer, drives the state timer $T_{active}$ again, and returns to the Exchange-Data state (steps B7–B9 and B 13–B15).

If the state timer $T_{active}$ expires in the Exchange_Data state, the base station compares a frame error rate (FER) with a threshold value FERt (steps B16 and B17). If the FER is greater than the threshold value FERt, the base station transmits the state transition command to the mobile station with the response request field being set and waits for a response from the mobile station (steps B21 and B22). The base station receives a response from the mobile station, transmits a confirm message to the mobile station, terminates the dedicated traffic channel DTCH, and transitions to the control hold state (steps B23, B24, B19 and B20). If the FER is not greater than the threshold value, the base station transmits the state transition command to the mobile station with the response request field being reset, terminates the dedicated traffic channel DTCH, and transitions to the control hold state (steps B17–B20). Upon receipt of data from the upper layer or lower layer in a response standby state (steps B25 and B26), the base station stops driving the state timer $T_{active}$(steps B11 and B5) to convert the received data.

Figure 6:
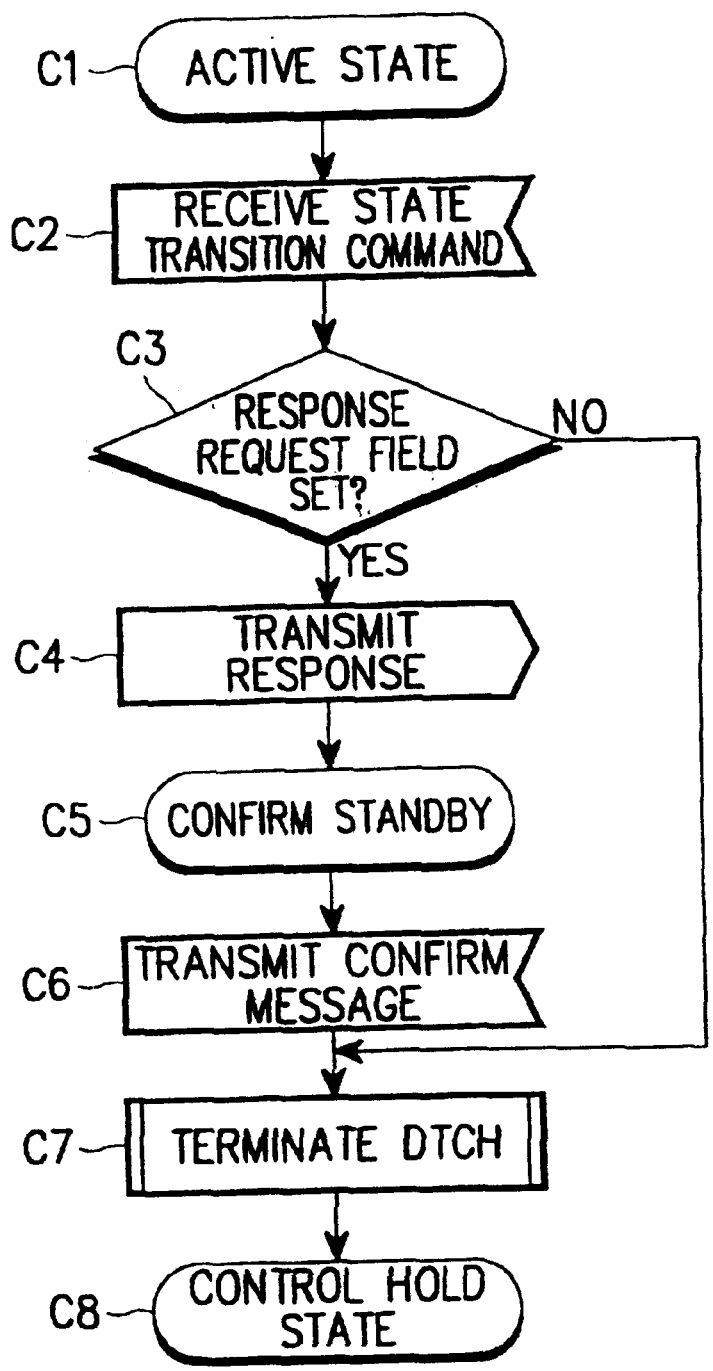
FIG. 6 is a flow chart illustrating a state synchronization process executed by a mobile station for packet data transmission with a base station generating a state transition command including a response request field according to an embodiment of the present invention.

FIG. 6 is a flow chart illustrating a state synchronization process executed by the mobile station for packet data transmission with the base station generating the state transition command including the response request field.

Upon receipt of the state transition command from the base station in the active state, the mobile station checks whether the response request field has been set (steps C1–C3). If it the response request field has been not set, the mobile station terminates the dedicated traffic channel DTCH and transitions to the control hold state (steps C7 and C8). If the response request field has been set, the mobile station transmits a response to the base station and waits for a confirm message (steps C4 and C5). Upon receipt of the confirm message from the base station, the mobile station terminates the dedicated traffic channel DTCH and transitions to the control hold state (steps C6–C8).

In the state synchronization processes using the signaling messages as shown in FIGS. 5 and 6, it is possible to determine whether to request a response by using a simple command message or a command message including a response request message according to radio circumstances. Therefore, the usage efficiency of the radio circumstances increases. That is, under a stable radio circumstance, the response request field is not set to omit the response and confirm steps (C4–C6 in FIG. 6), and thus, the termination of a corresponding channel and state transition are rapidly performed. Moreover, under a radio circumstance with a high FER, the response request field is set to increase system reliability.

As described above, in a MAC sublayer of a mobile communication system which provides a packet data service undergoing frequent changes in state, the response request field is included in the state transition command generated from the base station. The response and confirm steps may be omitted depending on whether the response request field is set or not. Hence, signaling overhead is minimized and state synchronization between the base station and mobile station is maintained. One can also rapidly check state inconsistency by using the watch timer, and hence, usage efficiency of radio resources is further increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A state synchronization method for transmitting packet data between a base station and a mobile station in a CDMA (Code Division Multiple Access) mobile communication system, comprising the steps of:

transmitting, at the base station, a state check message to the mobile station at a watch period in an active state;

receiving, at the base station, a response message from the mobile station; and transitioning a state of the base station to the state of the mobile station for synchronization by analyzing the received response message, wherein if the mobile station is in the active state, the base station maintains the active state, if the mobile station is in a control hold state, the base station transits to the control hold state, and if the mobile station is in a suspended state, the base station transits to the suspended state.

2. The state synchronization method as claimed in claim 1, wherein if the mobile station is in the active state, the base station maintains the active state; if the mobile station is in the control hold state, the base station terminates a dedicated traffic channel to transition to the control hold state; if the mobile station is in the suspended state, the base station terminates the dedicated traffic channel to transition to the control hold state and then terminates a dedicated control channel to transition to the suspended state; and if the mobile station is not in one of the active state, the control hold state, and the suspended state, the base station terminates the dedicated traffic channel to transition to the control hold state and terminates the dedicated control channel to transition to the suspended state, and terminates a common control channel to transition to a dormant state.

3. A state synchronization method for transmitting packet data between a base station and a mobile station in a CDMA mobile communication system, comprising the steps of:

transmitting, at the mobile station, a state check message to the base station at a watch period in an active state;

receiving, at the mobile station, a response message from the base station; and transitioning a state of the mobile station to the state of the base station for synchronization by analyzing the received response message, wherein if the mobile station is in the active state, the base station maintains the active state, if the mobile station is in a control hold state, the base station transits to the control hold state, and if the mobile station is in a suspended state, the base station transits to the suspended state.

4. The state synchronization method as claimed in claim 3, wherein if the base station is in the control hold state, the mobile station terminates a dedicated traffic channel to transition to the control hold state; if the base station is in the suspended state, the mobile station terminates the dedicated traffic channel to transition to the control hold state and then terminates a dedicated control channel to transition to the suspended state; and if the base station is not in one of the active state, the control hold state, and the suspended state, the mobile station terminates the dedicated traffic channel to transition to the control hold state and terminates the dedicated control channel to transition to the suspended state, and terminates a common control channel to transition to a dormant state.

5. A state synchronization method for transmitting packet data between a base station which generates a state transition command including a response request field and a mobile station in a CDMA mobile communication system, comprising the steps of:

checking, at the base station, a frame error rate at a state transition period in an active state;

if the frame error rate is greater than a threshold value, transmitting, at the base station, the state transition command with the response request field being set to the mobile station, terminating a dedicated traffic channel upon receipt of a response message from the mobile station, and transitioning the base station to a control hold state; and if the frame error rate is less than the threshold value, transmitting, at the base station, the state transition command with the response request field being reset to the mobile station, terminating the dedicated traffic channel, and transitioning the base station to the control hold state.

6. A state synchronization method for transmitting packet data between a base station which generates a state transition command including a response request field and a mobile station in a CDMA mobile communication system, comprising the steps of:

receiving, at the mobile station, the state transition command from the base station in an active state;

determining, at the mobile station, whether the response request field has been set by the received state transition command;

if the response request field has been not set, terminating a dedicated traffic channel and transitioning to a control hold state; and if the response request field has been set, transmitting a response message to the base station, receiving a check message from the base station, terminating the dedicated traffic channel, and transitioning to the control hold state.

* * * * *